(12) United States Patent
Aydin et al.

(10) Patent No.: US 11,920,835 B2
(45) Date of Patent: Mar. 5, 2024

(54) COOLING DEVICE, A TEST CHAMBER AND A METHOD

(71) Applicant: WEISS TECHNIK GMBH, Reiskirchen (DE)

(72) Inventors: Murat Aydin, Giessen (DE); Tobias Goepfert, Dresden (DE); Christian Haack, Marburg (DE)

(73) Assignee: Weiss Technik GmbH, Reiskirchen (DE)

( * ) Notice: Subject to any disclaimer, the term of this patent is extended or adjusted under 35 U.S.C. 154(b) by 317 days.

(21) Appl. No.: 17/171,639

(22) Filed: Feb. 9, 2021

(65) Prior Publication Data

US 2021/0247113 A1  Aug. 12, 2021

(30) Foreign Application Priority Data

Feb. 11, 2020 (DE) ..................... 10 2020 103 486.5

(51) Int. Cl.
*F25B 41/22* (2021.01)
*F25B 9/00* (2006.01)
*F25B 41/31* (2021.01)

(52) U.S. Cl.
CPC .............. *F25B 41/22* (2021.01); *F25B 9/008* (2013.01); *F25B 41/31* (2021.01); *F25B 2309/06* (2013.01); *F25B 2600/2513* (2013.01)

(58) Field of Classification Search
CPC .......... F25B 41/22; F25B 9/009; F25B 41/31; F25B 2390/06; F25B 2600/2531;
(Continued)

(56) References Cited

U.S. PATENT DOCUMENTS 3,872,682 A     3/1975  Shook
2014/0007613 A1*  1/2014  Uchida ..................... F01P 9/02
                                                 62/509

(Continued)

FOREIGN PATENT DOCUMENTS

EP            0344397 A2   12/1989
WO         2019048250 A1    3/2019
WO    WO-2019048250 A1 *   3/2019   ............. C09K 5/045

OTHER PUBLICATIONS

Sobieraj et al., High Phase-Separation Efficiency Auto-Cascade System Working with a Blend of Carbon Dioxide for Low-Temperature Isothermal Refrigeration, Applied Thermal Engineering, 2019, 161:114149, pp. 1-11.

(Continued)

*Primary Examiner* — Kun Kai Ma
(74) *Attorney, Agent, or Firm* — Quarles & Brady LLP (57) ABSTRACT

A method for operating a cooling device, a cooling device and a test chamber having a cooling device, a temperature of at least −80° C. or lower being established at the heat exchanger by means of the cooling device having a cooling circuit comprising a refrigerant, a heat exchanger, an internal heat exchanger, a compressor, a condenser and a controllable expansion element of the cooling device, the refrigerant undergoing a phase transition in the heat exchanger, the refrigerant of a high-pressure side of the cooling circuit being cooled by means of the internal heat exchanger, the cooling of the refrigerant of the high-pressure side by means of the internal heat exchanger being used to reduce an evaporation temperature at the expansion element, a zeotropic refrigerant being used as refrigerant, the expansion element being controlled by means of a control device of the cooling device in such a manner that the refrigerant partially freezes during an expansion at the expansion element.

20 Claims, 4 Drawing Sheets

(58) Field of Classification Search
CPC .......... F25B 9/006; F25B 40/02; F25B 49/02; C09K 2205/106; C09K 5/045; G01N 25/00

See application file for complete search history.

(56) References Cited

U.S. PATENT DOCUMENTS

2017/0082333 A1* 3/2017 Shimazu ................ F25B 43/00
2018/0120003 A1* 5/2018 Haack .................... F25B 40/00

OTHER PUBLICATIONS

European Patent Office, Search Report, Application No. 21153811.1, Jul. 1, 2021, 10 pages [No English Language Translation Available].

* cited by examiner

COOLING DEVICE, A TEST CHAMBER AND A METHOD

This application claims priority to German Patent Application no. DE 10 2020 103 486.5 filed Feb. 11, 2020, which is hereby incorporated by reference in it's entirety.

The disclosure relates to a method for operating a cooling device, a cooling device and a test chamber having a cooling device, a temperature of at least −80° C. or lower being established at the heat exchanger by means of the cooling device having a cooling circuit comprising a refrigerant, a heat exchanger, an internal heat exchanger, a compressor, a condenser and a controllable expansion element of the cooling device, the refrigerant undergoing a phase transition in the heat exchanger, the refrigerant of a high-pressure side of the cooling circuit being cooled by means of the internal heat exchanger, the cooling of the refrigerant of the high-pressure side by means of the internal heat exchanger being used to reduce an evaporation temperature at the expansion element, a zeotropic refrigerant being used as refrigerant.

Such methods and cooling devices are commonly employed in so-called test chambers which are used for checking physical and/or chemical properties of objects, in particular devices. For instance, temperature test chambers or climate test chambers are known within which temperatures ranging from −70° C. to +180° C. can be set. In climate test chambers, desired climate conditions can be additionally set to which the device or the test material is exposed over a defined period of time. A temperature of a test space receiving the test material to be tested is commonly controlled in a circulating air duct within the test space. The circulating air duct forms an air-treatment space in the test space in which heat exchangers are disposed for heating or cooling the air flowing through the circulating air duct and the test space. A fan or a ventilator aspirates the air located in the test space and guides it to the respective heat exchangers in the circulating air duct. In this way, the temperature of the test material can be controlled or the test material can be exposed to a defined temperature change. During a test interval, a temperature can fluctuate between a temperature maximum and a temperature minimum of the test chamber, for example. Such a test chamber is known from EP 0 344 397 A2, for example.

The refrigerant used in a cooling circuit should have a fairly low $CO_2$ equivalent, i.e., a relative greenhouse potential or global warming potential (GWP) should be as low as possible in order to avoid indirect damage to the environment in case the refrigerant is released. The GWP indicates how much a defined mass of a greenhouse gas contributes to global warming, carbon dioxide serving as the reference value. The value describes the mean warming effect over a specific period, 100 years being set here for the sake of comparability. For a definition of the relative $CO_2$ equivalent or GWP, reference is made to Intergovernmental Panel on Climate Change (IPCC), Fifth Assessment Report, Appendix 8.A, Table 8.A.1. The use of carbon dioxide ($CO_2$) as a pure substance refrigerant has been known. Carbon dioxide is available at low cost, is nonflammable and is essentially environmentally neutral due to a GWP of 1. Carbon dioxide has a freezing temperature or triple point of −56.6° C., wherefore lower temperatures cannot be attained using carbon dioxide. Moreover, a refrigerant should be nonflammable in order to not complicate filling, shipping and operation of a cooling circuit because of any safety regulations that may have to be observed. Also, production of a cooling circuit becomes more expensive if a flammable refrigerant is used because of the constructional measures required in that case. Flammability refers to the refrigerant's property of reacting to ambient oxygen by releasing heat. A refrigerant is flammable in particular if it is classified in fire class C of European standard EN2 and DIN 378 classes A2, A2L and A3 in their latest versions before the priority date of the application.

In a zeotropic refrigerant mixture, a phase transition happens across a temperature range which is known as the temperature glide. The temperature glide refers to a difference between the boiling temperature and the dew point temperature at constant pressure. Zeotropic refrigerant mixtures typically contain a high mass fraction of a nonflammable component, which is characterized by a comparatively high GWP, however. Also, the use of refrigerants should be as simple as possible, i.e., not require extensive technical restructuring of a cooling device. With refrigerants having a temperature glide of >3 K in particular, an expansion element and a heat exchanger or evaporator of the cooling circuit in question have to be adjusted to the evaporation temperature of the refrigerant and corresponding control has to be provided.

Furthermore, a distinction must be drawn between refrigerants that are designed for static operation of a cooling device, i.e., a cooling device having a temperature at the heat exchanger or evaporator that is essentially constant over a longer period of time, and refrigerants that are designed for a dynamic cooling device, which exhibits comparatively quick temperature changes at the heat exchanger. Dynamic cooling devices of this kind are integrated in test chambers, for example, which means that a refrigerant used has to be usable within a large temperature range. Furthermore, cooling devices in which a zeotropic refrigerant mixture is successively evaporated are known. This means that components of the refrigerant are evaporated one after the other by means of an expansion element. Cooling devices of this kind are also referred to as mixed fluid cascade systems and are suitable for realizing an essentially static cryogenic temperature.

Hence, the object of the present disclosure is to propose a method for operating a cooling device, a cooling device and a test chamber having a cooling device by means of which a temperature up to at least −80° C. can be established with simple means in an environmentally friendly and safe manner.

This object is attained by a method having the features of claim 1, a cooling device having the features of claim 14, a test chamber having the features of claim 19 and a use of a refrigerant having the features of claim 21.

In the method according to the disclosure for operating a cooling device, a temperature of at least −80° C. or lower is established at the heat exchanger by means of the cooling device having a cooling circuit comprising a refrigerant, a heat exchanger, an internal heat exchanger, a compressor, a condenser and a controllable expansion element of the cooling device, the refrigerant undergoing a phase transition in the heat exchanger, the refrigerant of a high-pressure side of the cooling circuit being cooled by means of the internal heat exchanger, the cooling of the refrigerant of the high-pressure side by means of the internal heat exchanger being used to reduce an evaporation temperature at the expansion element, a zeotropic refrigerant being used as refrigerant, the expansion element being controlled by means of a control device of the cooling device in such a manner that the refrigerant partially freezes during an expansion at the expansion element.

In the method according to the disclosure, the heat exchanger is connected to the cooling circuit or integrated into said cooling circuit in such a manner that a refrigerant circulating in the cooling circuit flows through the heat exchanger. For example, the heat exchanger can be disposed within a test space of a test chamber or in an air treatment space of the test space in such a manner that the air is conditioned and/or the temperature of the air is controlled by means of the heat exchanger. The internal heat exchanger is also integrated into the cooling circuit and is disposed in the flow direction of the refrigerant downstream of the condenser and upstream of the expansion element. The refrigerant is subcooled in the internal heat exchanger and, thus, the evaporation temperature of the refrigerant is reduced. This allows the establishment of comparatively low temperatures at the heat exchanger when the refrigerant evaporates in the heat exchanger after the expansion at the expansion element. The expansion element can be controlled by means of the control device of the cooling device in such a manner that a defined amount of the refrigerant flows via the expansion element within a period of time, the subcooled refrigerant being at all times liquid or in a liquid phase. The state of aggregation of the refrigerant changes after the expansion at the expansion element from liquid to gaseous as a function of the evaporating temperature at the expansion element. The refrigerant gradually evaporates in a temperature range or glide so that, in the cooling circuit and/or the heat exchanger, the refrigerant is in sections in a liquid and in a gaseous phase. In this case, the cooling device is operated as so-called cold vapor compression refrigerating system. According to the disclosure, the expansion element is controlled by means of the control device in such a manner that the refrigerant partially freezes during an expansion at the expansion element. This means that the refrigerant is downstream of the expansion element in the cooling circuit at least partially in the solid phase. In this case, it is essential that the refrigerant does not freeze completely, so that the still liquid or gaseous components of the refrigerant can transport the solid components of the refrigerant in the cooling circuit and a possible clogging of the cooling circuit by solid components is prevented. Then, the partially frozen or solid components of the refrigerant sublimate or transition from the solid phase to the gaseous phase. In this way, it is possible to use an enthalpy of sublimation of the refrigerant, which is a sum of an enthalpy of fusion and an enthalpy of evaporation. Consequently, it is possible to additionally use the enthalpy of fusion for the refrigeration. Since the process of sublimation of the refrigerant takes place at lower temperatures than the process of evaporation of the refrigerant, it becomes possible to achieve an even lower temperature with the refrigerant than would be possible with the refrigerant in a cold vapor process. The components of the refrigerant which freeze, consequently have the highest freezing point of all components of the refrigerant. When a component of the refrigerant freezes, solid particles are formed within the liquid phase of the refrigerant and the phases are strongly mixed which ensures the flow of the refrigerant. On the whole, it is therefore possible to cause the refrigerant to partially freeze only by means of an adjusted control device of the cooling device and/or an adjusted control of the expansion element, which allows an achievement of even lower temperatures at the heat exchanger. In this process, a refrigerant which is also used for a cold vapor process and which can be used in an environmentally friendly and safe manner can be used.

Consequently, the refrigerant can partially sublimate in the heat exchanger. In this process, the frozen part of the refrigerant in the heat exchanger and/or the particles in the liquid phase sublimate/s. As a result, a triple point of the liquid phase is lowered and, due to the low triple point, a conventional evaporation takes place. In addition to extending or reducing the temperature range of the cooling device, also an increased capacity of the cooling device is achieved. Depending on the requirements, the cooling device can be operated with a partially sublimating refrigerant or with a completely evaporating and/or liquid refrigerant. Therefore, by means of this method, it is possible to operate the cooling device with an essentially conventional cooling circuit. Thus, the compressor or the compressor device can aspirate the overheated refrigerant in a conventional manner and transport it continuously in the cooling circuit without requiring any restructuring of the cooling circuit.

In the cooling circuit, downstream of the expansion element and upstream of the heat exchanger, the refrigerant can be formed with a homogeneous mixture of a liquid and/or gaseous phase with particles of a solid phase. In particular, since a to the greatest possible extent homogeneous mixture of the liquid phase and/or wet vapor with the particles of the solid phase can be formed, a clogging or blockage of the cooling circuit by particles of the solid phase can be prevented. Moreover, it can be ensured that components of the refrigerant do not demix. Therefore, a mixing ratio of the components or a refrigerant mixture remains essentially constant or the same, at all times, along the cooling circuit.

The expansion element can be controlled by means of the control device in such a manner that a pressure of 1 bar or lower can be produced on a low-pressure side of the cooling circuit. Thus, a sublimation temperature and/or a sublimation pressure in the cooling circuit can also be set below an ambient pressure of 1 bar. This pressure can be set or controlled particularly easily by means of the control device and/or by means of the expansion element.

Further additional restructuring of the cooling circuit or the components is not required for this purpose. For example, the pressure on the low-pressure side can be produced easily by means of the control device by throttling the expansion element while the compressor is operated. In this case, the sublimation pressure can be selected as a function of the refrigerant used and/or the component contained in the refrigerant and of their respective sublimation temperature. Consequently, the control device can be set or programmed as a function of a refrigerant used.

A refrigerant mixture composed of a mass fraction of carbon dioxide and a mass fraction of at least one other component can be used as refrigerant. The refrigerant mixture can be composed of carbon dioxide and one or more fluorinated refrigerants which have a low GWP and are nonflammable or flammable to a limited degree only. A fraction of carbon dioxide has to be as low as possible because otherwise a freezing point of the refrigerant mixture would rise with an increasing mass fraction of carbon dioxide. However, a lower mass fraction of carbon dioxide reduces a GWP-reducing effect of the carbon dioxide. This is why partly fluorinated refrigerants have a significantly higher GWP than carbon dioxide, while also having an improved flame-retardant effect. The refrigerant can have a temperature glide of $\geq 10$ K, preferably of $\geq 15$ K, especially preferably of $\geq 18$ K. A temperature glide of the refrigerant should not be >20 K so that a cooling device can be operated appropriately.

A ratio of the components of the refrigerant can remain constant in the cooling circuit at all times. It is explicitly provided that the components of the refrigerant are guided via the expansion element in a mixing ratio of the refrigerant.

The other components can have a freezing point which is below a freezing point of the carbon dioxide at a pressure produced in the cooling circuit. In this case, the carbon dioxide is the component of the refrigerant which freezes partially or completely at the expansion element. The refrigerant can be subcooled in the internal heat exchanger to a temperature close to or below a triple point temperature of the component with the highest melting point or of the carbon dioxide. During the expansion of the refrigerant at the expansion element, the carbon dioxide can freeze partially or completely as a function of the subcooling of the refrigerant. If the cooling device is operated conventionally by means of the control device, the carbon dioxide can, also during the expansion, initially be only in the liquid phase. The other components of the refrigerant mixture have lower freezing points than the refrigerant mixture or the carbon dioxide and form a liquid phase during the expansion at the expansion element, the liquid phase serving as a carrier medium for the carbon dioxide which is present in the solid phase or in the form of particles.

The mass fraction of carbon dioxide can be 10 to 50 mass percent, preferably 30 to 50 mass percent. With such a mass fraction, a sufficiently low GWP can be achieved. At the same time, a clogging of the cooling circuit, which could occur if a mass fraction of carbon dioxide is comparatively high, can be prevented.

The other component can be pentafluoroethane and/or difluoromethane. Pentafluoroethane and difluoromethane in particular contain significant amounts of fluorine atoms, which leads to an undesirably high GWP. As was surprisingly found, however, a sufficiently low GWP, i.e., <400, for example, can be achieved with a refrigerant mixture containing a mass fraction of carbon dioxide of 30 to 40 mass percent with pentafluoroethane and/or difluoromethane. With the selection of further components, low GWP values, for example <150, can be achieved. As was also found, a flame-retardant effect of pentafluoroethane is comparatively greater than that of carbon dioxide. Moreover, the negative properties of pentafluoroethane and of carbon dioxide can be reduced by adding difluoromethane as a third component of the refrigerant mixture. Thus, a refrigerant mixture containing pentafluoroethane and difluoromethane can be classified as nonflammable. At the same time, difluoromethane has a lower freezing temperature with carbon dioxide than with pentafluoroethane. Consequently, a mixture of pentafluoroethane, difluoromethane and carbon dioxide can achieve a lower freezing temperature than pentafluoroethane and carbon dioxide alone. Difluoromethane thus lowers the freezing point of the refrigerant mixture significantly, a certain mass fraction of carbon dioxide being required in order for the refrigerant mixture to be nonflammable. At the same time, however, difluoromethane leads to a high final compression temperature, which is why difluoromethane is suitable only within limits as a sole mixing partner for carbon dioxide. Pentafluoroethane cannot lower a freezing point of the refrigerant mixture as far as difluoromethane, but has a greater flame-retardant effect than carbon dioxide, which is advantageous.

In another embodiment, in the refrigerant, a mass fraction of carbon dioxide can be 33 to 38, preferably 35 mass percent, a mass fraction of pentafluoroethane can be 33.5 to 31, preferably 32.5 mass percent, and a mass fraction of difluoromethane can be 33.5 to 31, preferably 32.5 mass percent. Accordingly, the refrigerant mixture may consist solely of three components. In this case, a mass fraction of the components difluoromethane and pentafluoroethane is equal. As described above, a mixture of carbon dioxide with pentafluoroethane and difluoromethane has proven particularly advantageous. This refrigerant mixture can have a temperature glide of >7 K at evaporation pressures around 1 bar. Furthermore, this refrigerant mixture leads to a concentration-dependent reduction of the freezing point. Hence, flammable and nonflammable refrigerant mixtures for different temperature applications may arise when mass fractions deviate from the indicated mass fractions.

According to DIN 8960 in its latest version before the priority date of the application, carbon dioxide ($CO_2$) is also known as a refrigerant or a component under the designation R744, pentafluoroethane ($C_2HF_5$) is known under the designation R125 and difluoromethane ($CH_2F_2$) is known under the designation R32.

The refrigerant can partially freeze at a temperature below −75° C. and can be liquid and/or gaseous at a temperature above −75° C. Consequently, in this case, the refrigerant can be used for an operation of the cooling device either only with the refrigerant in the liquid phase and vaporous phase or with the refrigerant in the liquid phase, vaporous phase and solid phase.

In the method, a temperature of at least −90° C., preferably −100° C. or lower, can be established at the heat exchanger. In this case, the method allows an essential reduction of a temperature at the heat exchanger, which would not be possible with a conventional operation of the cooling device with the refrigerant.

The refrigerant can be nonflammable and may have a relative CO2 equivalent of <2500, preferably <1500, particularly preferably <500, over 100 years. Consequently, the refrigerant may be of little harm to the environment. If the refrigerant is nonflammable, the cooling circuit and a test chamber in particular can be designed more cost-effectively because no special safety measures in terms of flammability of the refrigerant will have to be observed. In this case, the refrigerant may at least not be classified in fire class C and/or refrigerant safety group A1. Moreover, shipping and transport of the cooling circuit is easier because the cooling circuit can be filled with the refrigerant before being transported, irrespective of the mode of transport. If a flammable refrigerant is used, filling may not be possible until start-up at the installation site. Furthermore, use of the nonflammable refrigerant in the presence of ignition sources is possible.

The cooling device can be realized as a compression refrigerating system and be operated either as such having the refrigerant in a liquid and vaporous phase in a first operating state or in a second operating state as a sublimation refrigerating system having the refrigerant in a partially solid phase.

The cooling device according to the disclosure serves for the conditioning of air, the cooling device having a cooling circuit comprising a refrigerant, a heat exchanger, an internal heat exchanger, a compressor, a condenser and a controllable expansion element, a temperature of at least −80° C. or lower being establishable at the heat exchanger by means of the cooling device, the refrigerant being able to undergo a phase transition in the heat exchanger, the internal heat exchanger being usable to cool the refrigerant of the high-pressure side of the cooling circuit and to reduce an evaporation temperature at the expansion element, the refrigerant being a zeotropic refrigerant, the cooling device having a control device by means of which the expansion element is controllable, the expansion element being controllable by means of the control device in such a manner that the refrigerant can partially freeze during an expansion at the expansion element. Regarding the advantages of the cooling device according to the disclosure, reference is made to the description of advantages of the method according to the disclosure.

The internal heat exchanger may be connected to the high-pressure side of the cooling circuit upstream of the expansion element and downstream of the condenser and to a low-pressure side of the cooling circuit upstream of the compressor and downstream of the heat exchanger. By use of the internal heat exchanger and cooling of the liquefied refrigerant of the high-pressure side by means of the internal heat exchanger, temperatures below −56° C. can be reached easily. The evaporation temperature of the refrigerant cooled by means of the internal heat exchanger can be reduced at the expansion element relative to an evaporation temperature of an uncooled refrigerant. The cold capacity transferred from the low-pressure side to the high-pressure side via the internal heat exchanger can thus be used at least in part, preferably exclusively, to reduce the evaporation temperature of the refrigerant at the expansion element. Furthermore, use of a zeotropic refrigerant having a temperature glide is made possible in the first place because the location of the dew point temperature of the refrigerant or the dew point of the refrigerant can be shifted into the internal heat exchanger in this case. As a consequence of the temperature glide of the zeotropic refrigerant, the achieved dew point temperature of the refrigerant may be comparatively high and thus prevent the heat exchanger from cooling further. Thus, the so-called effective temperature glide, i.e. the temperature difference during an isobaric partial evaporation in the heat exchanger, can be controlled in a targeted manner. Consequently, a temperature can also be set precisely when refrigerants having a high temperature glide >7 K are used. The internal heat exchanger may be realized as a subcooling section or a heat exchanger, in particular a plate heat exchanger. The subcooling section may simply be realized by two line sections of the cooling circuit that are in contact with each other.

The control device can have at least one pressure sensor and/or at least one temperature sensor in the cooling circuit, the expansion element being actuable by means of the control device as a function of a measured temperature and/or a pressure. The expansion element may have a throttle and a magnetic valve, in which case refrigerant can be metered via the throttle and the magnetic valve. The throttle may be a settable valve or a capillary via which refrigerant is routed by means of the magnetic valve. The magnetic valve itself may be actuated by means of the control device. The control device may comprise means for data processing which process sets of data from sensors and control the magnetic valves. In this case, a control of a function of the cooling device may also be adjusted to the refrigerant used via an appropriate computer program, for example. Furthermore, the control device may signal a malfunction and initiate a shut-down of the cooling device, if necessary, in order to protect the cooling device from damage due to critical or undesirable operating states.

In another embodiment, the condenser may be realized as a cascade heat exchanger of another cooling circuit of the cooling device. Accordingly, the cooling device may have at least two cooling circuits, in which case the cooling circuit may form a second stage of the cooling device and another cooling circuit, which is disposed upstream of the cooling circuit, may form a first stage of the cooling device. In this case, the condenser serves as a cascade heat exchanger or a heat exchanger for the other cooling circuit. This embodiment allows particularly low temperatures to be established at the heat exchanger in the test space.

A first bypass having at least one controllable second expansion element may be realized in the cooling circuit, in which case the first bypass may be connected to the cooling circuit upstream of the internal heat exchanger and downstream of the condenser and the first bypass may be realized as a controllable additional internal cooling system. The first bypass may thus form a re-injection device for refrigerant. Accordingly, refrigerant can be supplied from the controllable second expansion element to the internal heat exchanger on the low-pressure side. In this case, the first bypass may be connected to the low-pressure side of the cooling circuit upstream of the internal heat exchanger and downstream of the heat exchanger. The refrigerant cooled or having its temperature level lowered by the second expansion element may be led through the internal heat exchanger and intensify cooling of the refrigerant on the high-pressure side of the internal heat exchanger. Also, a cooling capacity of the internal heat exchanger can be controlled even more precisely in this way.

The test chamber according to the disclosure has a cooling device according to the disclosure, the test chamber comprising for conditioning air a test space which can be sealed against an environment and is temperature-insulated and which serves to receive test material, and a temperature control device which comprises the cooling device and serves to control the temperature of the test space, a temperature in a temperature range of −80° C. to +180° C., preferably −90° C. to +180° C., especially preferably −100° C. to +180° C., being establishable within the test space by means of the temperature control device The temperature control device may have a heating device comprising a heater and a heating heat exchanger in the test space. The heating device may be an electric resistance heater, for example, which heats the heating heat exchanger in such a manner that the temperature in the test space can be raised by means of the heating heat exchanger. If the heat exchanger and the heating heat exchanger can be controlled in a targeted manner by means of a control device to cool or heat the air circulated in the test space, a temperature in the temperature range indicated above can be established within the test space by means of the temperature control device. Alternatively, a high temperature can also be established in the test space by means of waste heat of the test material.

Further embodiments of a test chamber are derived from the description of features of the dependent claims referring back to device claim 14.

When a zeotropic refrigerant consisting of a refrigerant mixture composed of a mass fraction of carbon dioxide and a mass fraction of at least one other component, the other component having a freezing point which is below a freezing point of the carbon dioxide at a pressure produced in the cooling circuit, the other component being in a liquid and/or gaseous phase and the carbon dioxide being at least partially in a solid phase, is used according to the disclosure in a cooling circuit of a cooling device, the other component is a carrier medium for the carbon dioxide in the solid phase. With regard to the advantages of the use according to the disclosure, reference is made to the description of advantages of the method according to the disclosure. Other embodiments of a use are derived from the description of features of the dependent claims referring back to method claim 1 and to device claim 14.

Hereinafter, preferred embodiments of the disclosure will be explained in more detail with reference to the accompanying drawings.

Figure 2:
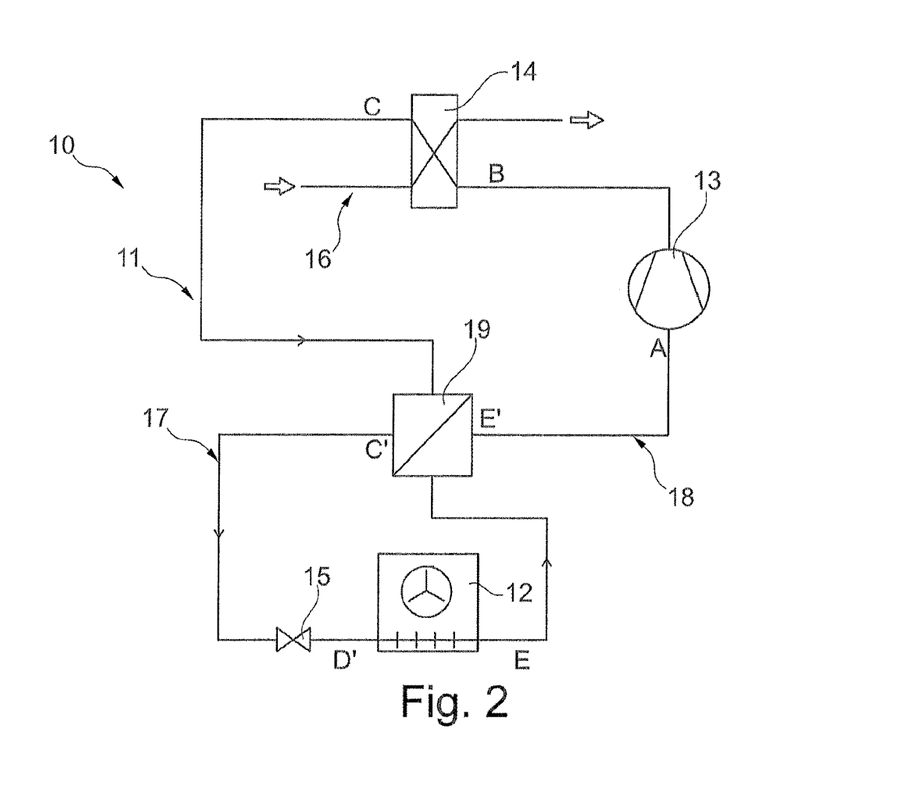
FIG. 2 is a schematic illustration of a first embodiment of a cooling device.

FIG. 2 shows a first embodiment of a cooling device 10 of a test chamber (not shown). Cooling device 10 comprises a cooling circuit 11 with a refrigerant, a heat exchanger 12, a compressor 13, a condenser 14 and an expansion element 15. Condenser 14 is cooled by another cooling circuit 16 in the case at hand. Heat exchanger 12 is disposed in a test space (not shown) of the test chamber. Furthermore, cooling circuit 11 has a high-pressure side 17 and a low-pressure side 18, to which an internal heat exchanger 19 is connected.

Figure 1:
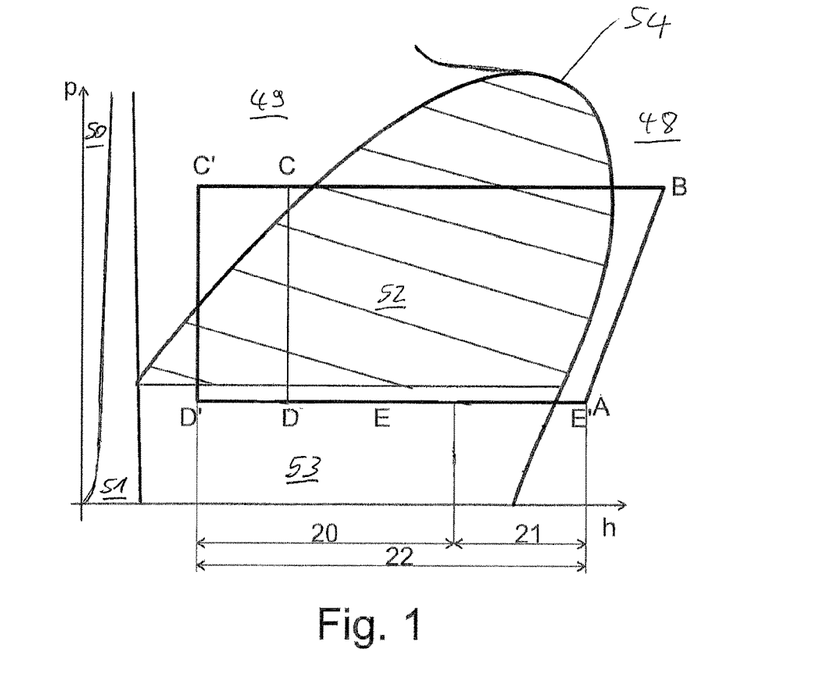
FIG. 1 is a pressure-enthalpy diagram for a refrigerant.

FIG. 1 shows a pressure-enthalpy diagram (log p/h diagram) for the refrigerant circulating in cooling circuit 11, the refrigerant being a zeotropic refrigerant. In the pressure-enthalpy diagram, different states of aggregation of the refrigerant are illustrated. In particular, a region 48 with the refrigerant in a gaseous phase, a region 49 with the refrigerant in a liquid phase, a region 50 with the refrigerant in a solid phase, a region 51 with the refrigerant in a solid and liquid phase, a region 52 with the refrigerant in a liquid and gaseous phase and a region 53 with the refrigerant in a solid, liquid and gaseous phase are shown. Since a composition of the liquid phase changes during the expansion, the refrigerant can also be in an equilibrium with three coexisting phases. A transition between the respective states of aggregation takes place at boundary lines 54 between regions 48 to 53.

According to a combined view of FIGS. 1 and 2, starting from position A, the refrigerant upstream of compressor 13 is aspirated and compressed, whereby a pressure is achieved downstream of compressor 13 according to position B. The refrigerant is compressed by means of compressor 13 and is subsequently liquefied in condenser 14 according to position C. The refrigerant passes through internal heat exchanger 19 on high-pressure side 17, where it is cooled further, position C' upstream of expansion element 15 thus being reached. By means of internal heat exchanger 19, the portion of the wet vapor area (positons E to E') not usable in heat exchanger 12 can be used to further reduce a temperature of the refrigerant (positions C' to C). At expansion element 15, the refrigerant is relaxed (positions C' to D') and partially liquefied in heat exchanger 12 (positions D' to E). In this process, the refrigerant partially freezes as a function of the subcooling of the refrigerant at internal heat exchanger 19 or of a control of expansion element 15. Then, the wet vapor of the refrigerant enters internal heat exchanger 19 on low-pressure side 18, where the refrigerant is re-evaporated until the dew-point temperature or the dew point of the refrigerant is reached at position E'. Hence, a first subsection 20 of an evaporation section 22 of the refrigerant runs through heat exchanger 12, a second subsection 21 of evaporation section 22 running through internal heat exchanger 19. The essential aspect is that a suction pressure of compressor 13 on low-pressure side 18 is kept constant on evaporation section 22 even if the evaporation temperature at expansion element 15 changes.

The refrigerant is a refrigerant mixture composed of a mass fraction of carbon dioxide of 30 to 50 mass percent and a mass fraction of at least one other component, the other component being pentafluoroethane and/or difluoromethane. In principle, it is possible to use also other suitable refrigerants in cooling circuit 11 and the cooling circuits described below.

Figure 3:
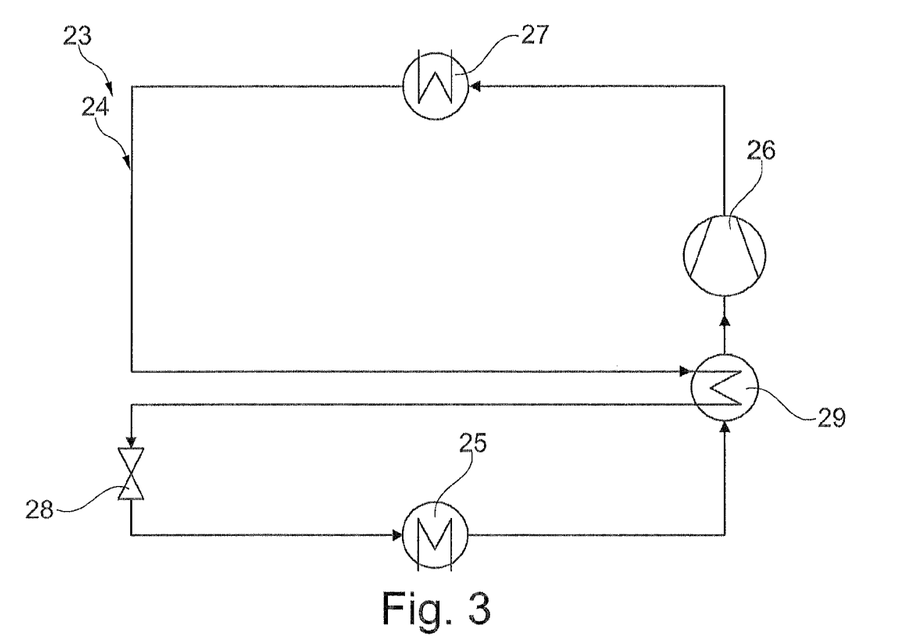
FIG. 3 is a schematic illustration of a second embodiment of a cooling device.

FIG. 3 shows a schematic illustration of a simplest embodiment of a cooling device 23, cooling device 23 being self-controlling. The cooling device comprises a cooling circuit 24 with a heat exchanger 25, a compressor 26, a condenser 27, an expansion element 28 and an internal heat exchanger 29. Depending on a temperature at heat exchanger 25, refrigerant not fully evaporated escapes from heat exchanger 25 because the temperature at heat exchanger 25 or in a test space (not shown) is no longer high enough to cause a phase transition. In this case, refrigerant still liquid is re-evaporated in internal heat exchanger 29 because a temperature difference there has to be greater than at heat exchanger 25 at all times. Once the temperature of the liquid refrigerant upstream of expansion element 28 has been reduced by heat exchange in internal heat exchanger 29, the energy density and the temperature difference achievable with it at heat exchanger 25 increase. Cooling device 23 does not require elaborate control by way of sensors etc.

Figure 4:
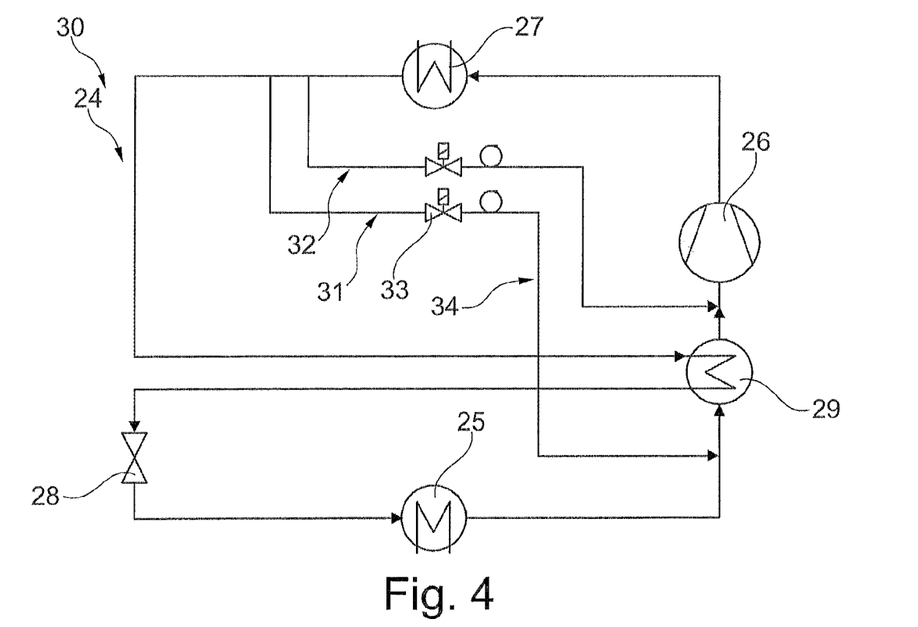
FIG. 4 is a schematic illustration of a third embodiment of a cooling device.

FIG. 4 shows a cooling device 30 which differs from the cooling device of FIG. 3 in that it has a first bypass 31 and a second bypass 32. A controllable second expansion element 33 is disposed in first bypass 31, first bypass 31 being configured as an additional internal cooling system 34. First bypass 31 is connected to cooling circuit 24 immediately downstream of condenser 27 upstream of internal heat exchanger 29 and downstream of heat exchanger 25 and upstream of internal heat exchanger 29. First bypass 31 thus bypasses expansion element 28 with heat exchanger 25, internal heat exchanger 29 being suppliable with evaporating refrigerant via second expansion element 33. A suction gas mass flow introduced into internal heat exchanger 29 can be cooled additionally by means of first bypass 31 in case of high suction gas temperatures, which may be caused by heat exchanger 25. In this way, evaporation of refrigerant upstream of the expansion element can be precluded. Hence, first bypass 31 can be used to react to changing load cases of cooling device 30. Second bypass 32 has a third expansion element 35 and is connected to cooling circuit 24 downstream of condenser 27 and upstream of internal heat exchanger 29 and downstream of internal heat exchanger 29 and upstream of compressor 26. This allows a suction gas mass flow upstream of compressor 26 to be reduced far enough via second bypass 32 to avoid inadmissibly high final compression temperatures.

Figure 5:
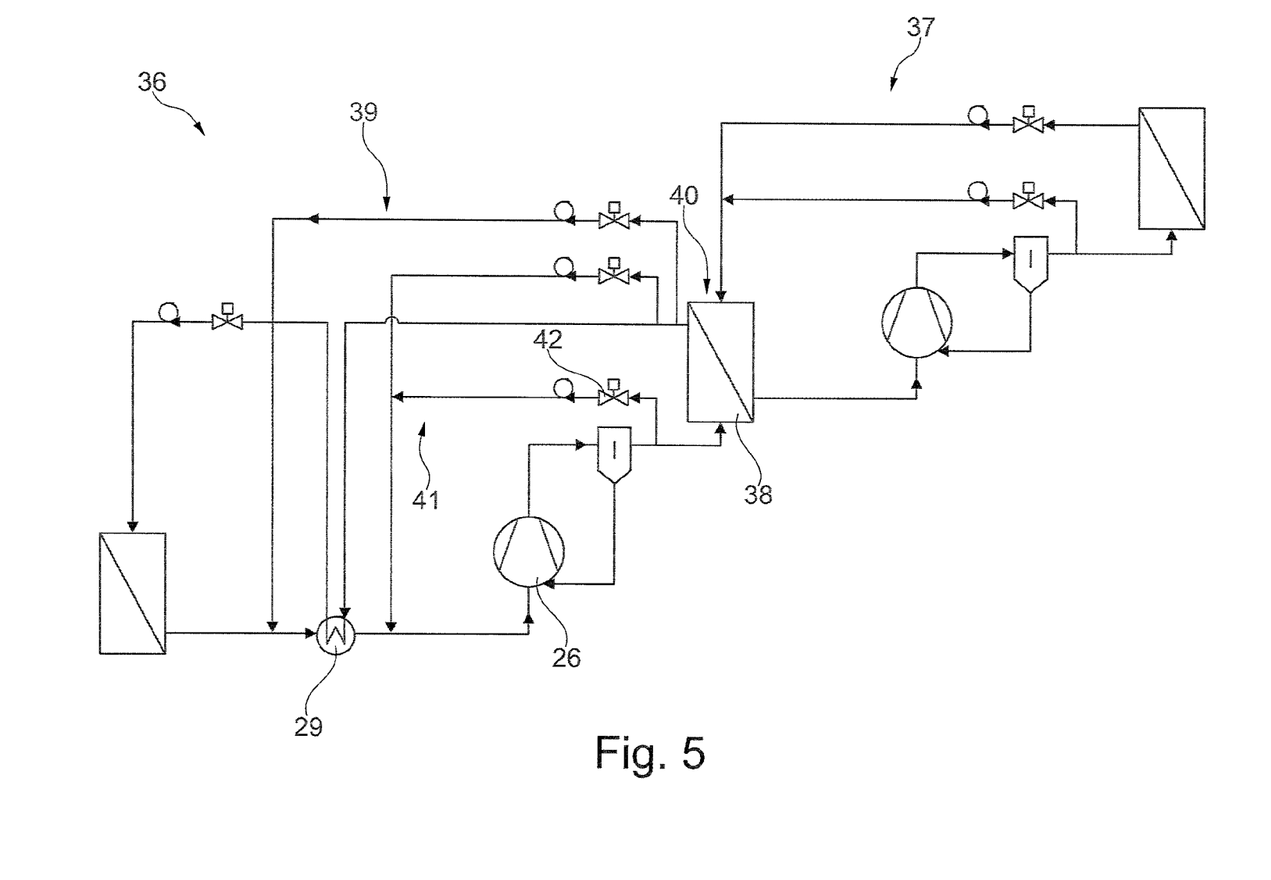
FIG. 5 is a schematic illustration of a fourth embodiment of a cooling device.

FIG. 5 shows a cooling device 36 which differs from the cooling device of FIG. 4 in that it has another cooling circuit 37. Other cooling circuit 37 serves to cool a condenser 38 of a cooling circuit 39. Condenser 38 is realized as a cascade heat exchanger 40 in the case at hand. Furthermore, cooling circuit 39 has another bypass 41 having another expansion element 42. Other bypass 41 is connected to cooling circuit 39 downstream of compressor 26 and upstream of condenser 38 and downstream of internal heat exchanger 29 and upstream of compressor 26. Thus, refrigerant not yet liquefied but compressed can flow back to upstream of compressor 26 via other bypass 41, whereby a suction gas temperature and/or a suction gas pressure of the refrigerant can be controlled.

Figure 6:
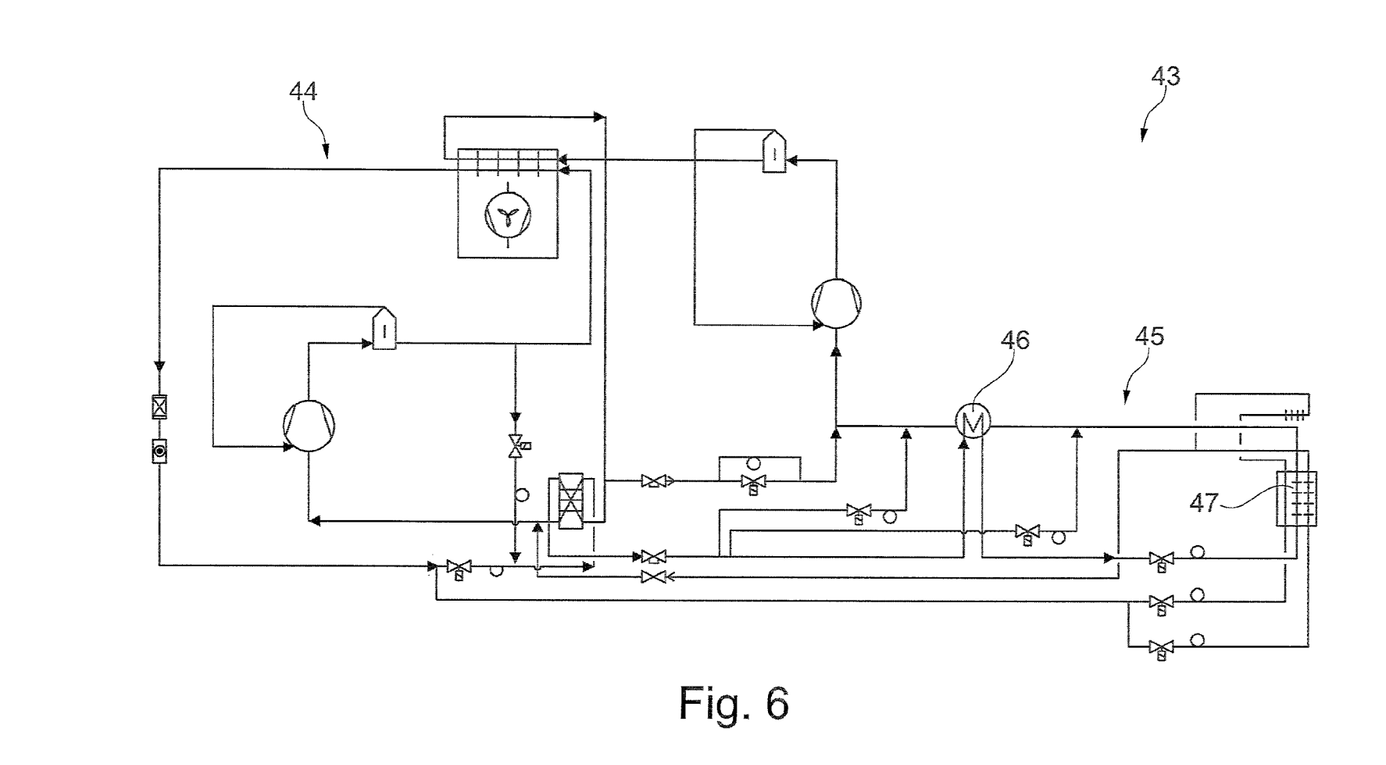
FIG. 6 is a schematic illustration of a fifth embodiment of a cooling device.

FIG. 6 shows a cooling device 30 having a cooling circuit 44 and another cooling circuit 45 and, in particular, an internal heat exchanger 46 in cooling circuit 44. In the case at hand, a heat exchanger 47 is disposed in a temperature-insulated test space of a test chamber (not shown).

The invention claimed is:

1. A method for operating a cooling device, a temperature of at least −80° C. or lower being established at a heat exchanger by means of the cooling device having a cooling circuit comprising a refrigerant, the heat exchanger, an internal heat exchanger, a compressor, a condenser and a controllable expansion element of the cooling device, the refrigerant undergoing a phase transition in the heat exchanger, the refrigerant of a high-pressure side of the cooling circuit being cooled by means of the internal heat exchanger, the cooling of the refrigerant of the high-pressure side by means of the internal heat exchanger being used to reduce an evaporation temperature at the controllable expansion element, a zeotropic refrigerant being used as refrigerant,
wherein
the controllable expansion element is controlled by means of a control device of the cooling device in such a manner that the refrigerant partially freezes during an expansion at the controllable expansion element.

2. The method according to claim 1, wherein the refrigerant partially sublimates in the heat exchanger.

3. The method according to claim 1, wherein in the cooling circuit, downstream of the controllable expansion element and upstream of the heat exchanger, the refrigerant is formed with a homogeneous mixture of a liquid and/or gaseous phase with particles of a solid phase.

4. The method according to claim 1, wherein the controllable expansion element is controlled by means of the control device in such a manner that a pressure of 1 bar or lower is produced on a low-pressure side of the cooling circuit.

5. The method according to claim 1, wherein a refrigerant mixture composed of a mass fraction of carbon dioxide (CO2) and a mass fraction of at least one other component is used as refrigerant.

6. The method according to claim 5, wherein a ratio of the components of the refrigerant remains constant in the cooling circuit at all times.

7. The method according to claim 5, wherein the other component has a freezing point which is below a freezing point of the carbon dioxide (CO2) at a pressure produced in the cooling circuit.

8. The method according to claim 5, wherein the mass fraction of carbon dioxide (CO2) is 10 to 50 mass percent.

9. The method according to claim 5, wherein the other component is pentafluoroethane (C2HF5) and/or difluoromethane (CH2F2).

10. The method according to claim 1, wherein the refrigerant partially freezes at a temperature below −75° C. and is liquid and/or gaseous at a temperature above −75° C.

11. The method according to claim 1, wherein a temperature of at least −90° C. is established at the heat exchanger.

12. The method according to claim 1, wherein the refrigerant is nonflammable and has a relative CO2 equivalent of <2500 over 100 years.

13. The method according to claim 1, wherein the cooling device is realized as a compression refrigerating system and is operated either as such having the refrigerant in a liquid and vaporous phase in a first operating state or in a second operating state as a sublimation refrigerating system having the refrigerant in a partially solid phase.

14. A cooling device for conditioning air, the cooling device having a cooling circuit comprising a refrigerant, a heat exchanger, an internal heat exchanger, a compressor, a condenser and a controllable expansion element, a temperature of at least −80° C. or lower being establishable at the heat exchanger by means of the cooling device, the refrigerant being able to undergo a phase transition in the heat exchanger, the internal heat exchanger being usable to cool the refrigerant of a high-pressure side of the cooling circuit and to reduce an evaporation temperature at the controllable expansion element, the refrigerant being a zeotropic refrigerant, the cooling device having a control device by means of which the controllable expansion element is controllable,
wherein
the controllable expansion element is controllable by means of the control device in such a manner that the refrigerant can partially freeze during an expansion at the controllable expansion element.

15. The cooling device according to claim 14, wherein the internal heat exchanger is connected to the high-pressure side of the cooling circuit upstream of the controllable expansion element and downstream of the condenser and to a low-pressure side of the cooling circuit upstream of the compressor and downstream of the heat exchanger.

16. The cooling device according to claim 14, wherein the control device has at least one pressure sensor and/or at least one temperature sensor in the cooling circuit, the controllable expansion element being actuable by means of the control device as a function of a measured temperature and/or a pressure.

17. The cooling device according to claim 14, wherein the condenser is realized as a cascade heat exchanger of another cooling circuit of the cooling device.

18. The cooling device according to claim 14, wherein a first bypass having at least one controllable second expansion element is realized in the cooling circuit, the first bypass being connected to the cooling circuit upstream of the internal heat exchanger and downstream of the condenser, the first bypass being realized as a controllable additional internal cooling system.

19. A test chamber having a cooling device according to claim 14, the test chamber comprising for conditioning air a test space which can be sealed against an environment and is temperature-insulated and which serves to receive test material, and a temperature control device which comprises the cooling device and serves to control the temperature of the test space, a temperature in a temperature range of −80° C. to +180° C. being establishable within the test space by means of the temperature control device.

20. The test chamber according to claim 19, wherein the temperature control device comprises a heating device having a heater and a heating heat exchanger in the test space.

* * * * *